RECORD CHANGERS CUT OUT DEVICE
Filed Oct. 13, 1961
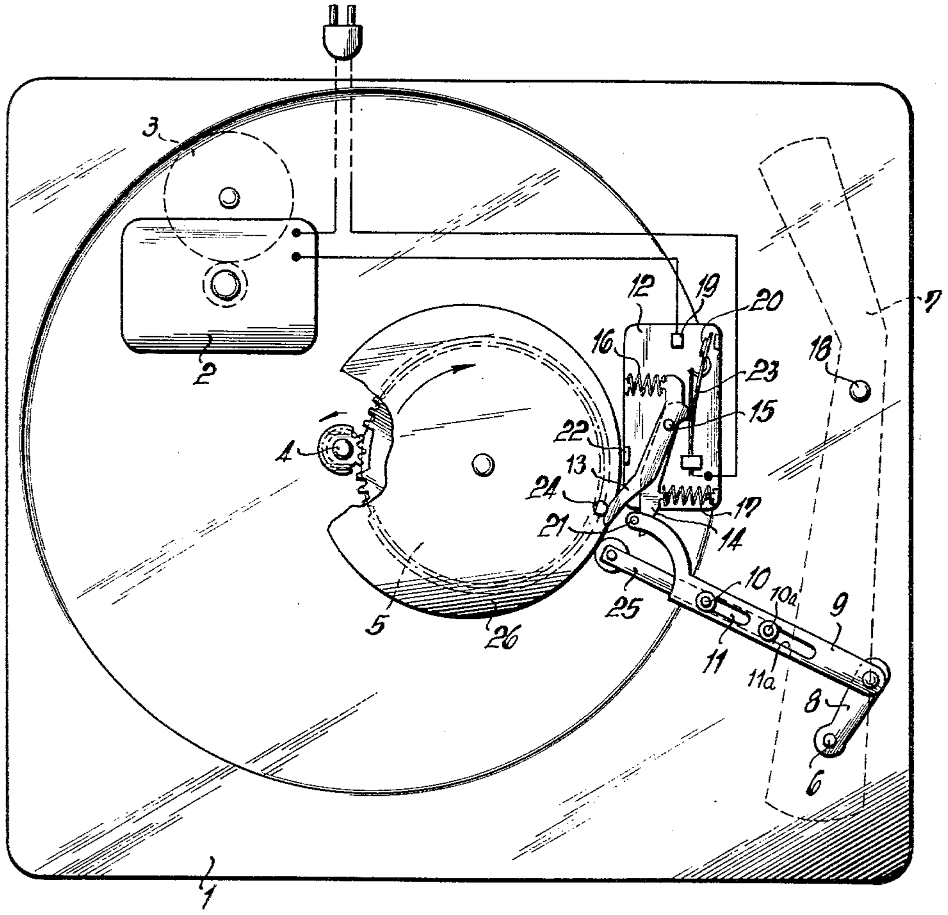
INVENTOR
HELMUT LAUFER
By Otto John Munz
Attorney

United States Patent Office 3,163,428
Patented Dec. 29, 1964

3,163,428

RECORD CHANGERS CUT OUT DEVICE

Helmut Laufer, St. Georgen, Black Forest, Germany, assignor to Oskar Steidinger and Siegfried Steidinger, trading as the firm Gebrueder Steidinger, St. Georgen, Black Forest, Germany Filed Oct. 13, 1961, Ser. No. 144,989
Claims priority, application Germany, Oct. 31, 1960, St 17,066
5 Claims. (Cl. 274—10)

The invention concerns a cut-out device for record changers having a driving motor the circuit of which is adapted to be controlled on the one hand by a switch coupled with a changing mechanism and on the other hand by a switch coupled by the swivel movement of the pick-up and an apparatus which by dropping the last record of the stack of records prevents the pick-up from being swiveled again.

In a known apparatus of this type the switch coupled with the swivel movement of the pick-up opens each time the pick-up is in the swung out position. The second switch controlled by the changing mechanism, arranged parallel to the first switch, is coupled in such a manner with the record dropping device that in dependence upon the presence or absence of the lowermost record of the stack it opens and closes. The stopped apparatus is set in motion again however automatically as soon as a record irrespective of the reason for it, reaches the suitable critical position relative to the dropping device. This makes faulty conditions unavoidable.

In accordance with another known apparatus one switch is coupled with a vertically displaceable pick-up support and a second with the dropping device and thus in such a manner that after the last record of the stack has been dropped the switch opens and remains open until it is closed again by hand. Though by this means the disadvantages of the above described device are avoided, the operation of the apparatus for playing a single record however is cumbersome since in addition to placing the pick-up in position, the apparatus has to be switched on.

Another known apparatus has only on switch which is coupled with a vertically displaceable pick-up support. Switching off is effected by the fact that the pick-up by means of the dropping device after the last record of the stack has been dropped is prevented from swinging back and thereby is caused to be lowered on to the support coupled with the switch. Hence though it is necessary for playing an individual record only to place the pick-up in position, it does however necessitate a switch actuated by the weight of the pick-up. The function of such a switch with the light supporting weight of the pick-up as of interest nowadays is not reliable.

In accordance with the invention the disadvantages of the known arrangements are removed by the fact that the switch coupled with the changing mechanism opens periodically during each working period, thus after the pick-up has swung into position on the record to be played and the switch coupled with the swivel movement of the pick-up opens with each swivel out movement of the pick-up.

The invention will be described further by way of example with reference to the accompanying drawing which shows a record changer seen from below.

A motor 2, through an intermediate gear 3, drives the turntable, not shown, mounted on a base plate 1. The axle 4 of the turntable, not shown drives the control mechanism 5 for the pick-up and the lowering mechanism. Nonrotatably mounted on the vertical swivel axle 6 of the pick-up 7 is a swivel arm 8 which is coupled to a rod 9. Two spaced pins or guides 10 and 10*a* are fixed to base 1. Rod 9 has longitudinally spaced aligned slots 11 and 11*a* which receive the respective pins to thereby guide the rod for translation only in the direction of its length, between a limiting position radially outward of the turntable, as shown upon the figure, wherein each pin engages one end of its slot. The limiting position corresponds to a position wherein the pick-up, or tone arm is located upon its rest 18. A toggle switch 12 connected in the motor circuit is adapted to be actuated by either of levers 13 or 14. Both levers are mounted upon a common pin 15 for independent pivoting about the fixed axis thereof. Both levers are biased in a clockwise direction as seen upon the figure, by means of springs 16, 17 respectively and their rotation in this direction is limited by a common stop 22. The spring of each actuating lever has enough pre-tension to overcome the pre-tension of the toggle switch spring 23 and is thus able to keep the contacts 19, 20 thereof open.

The operation is as follows: The apparatus is shown in the inoperative position, i.e. the pick-up 7 is disposed on its support or rest 18 and the motor circuit is broken at the contacts 19, 20. If the pick-up 7 is lifted by hand off its support and swung into position the lever 14 which is urged by spring 17 against stop 21 fixed with the inner end of rod 9 follows this movement and before pick-up 7 has swung into position to the maximum record diameter, the actuating lever 14 has actuated toggle switch spring 23. The contacts 19, 20 are thus closed and the actuating lever 14 abuts its stop 22. When the pick-up is returned by hand these operations are repeated in reverse sequence. The toggle switch spring 23 due to its pre-tension follows the returning lever 14 and allows the contacts 19, 20 to snap back into their opened original position.

If the apparatus is operated as an automatic record changer, the start is effected in a manner known per se and shown for example in Patent No. 2,707,639. Due to the operation of the control mechanism 5 a stop 24 fixed on the cam releases the actuating lever 13 which, due to the thrust of spring 16, pivots clockwise as viewed upon the figure, toward stop 22 thus closing the switch. The control mechanism is now driven by the motor via the turntable. Thus, if in known manner and not shown, it has swung the pick-up 7 to the maximum possible starting groove diameter of the records, the actuating lever 14 too has moved as described above, into the switch-closing position. When the working period of the control mechanism 5 has ended, lever 13 has again made contact with the stop 24. The working period is thus seen to be the time it takes stop 24 to be carried around one revolution of the cam. The toggle switch has thus not returned into its opening position as it is still retained switched on by the lever 14 which has been swung about in the meantime. When the pick-up enters the finishing groove of the record, the control mechanism 5 is again operated in a manner known per se but not shown. When the pick-up has reached its outermost swivel position over the support 18, the lever 14 has been returned into its cut-out position. Since however the working period has not yet ended, the actuating lever 13 is still in the switch-closing position and the control mechanism continues to operate until the pick-up is swung inwardly again and placed on the record. This again results in the previously described position according to which the motor remains switched on.

When the last record of the stack has been played and the pick-up swung outwards it is, as shown and described in the U.S. Patent 2,707,639, by means of a so-called end stop switch off mechanism in a manner known per se, but not shown, prevented from swinging inwardly again, i.e. the actuating lever 14 is retained in the cut-out position. If this time the control mechanism 5 operates to the end, then in a manner described it brings the actuating lever 13 into the cut-out position, whereby the toggle switch 12 is adapted to snap back into its cut-out position shown.

The rod mechanism 9, as shown by the example on the drawing, is adapted to serve at the same time for the swivel drive of the pick-up, in that it is adapted to be coupled with frictional engagement with the slider 25, which slides on a control cam 26 of the control mechanism 5.

I claim:

1. In a phonograph, a turntable, a motor connected to rotate said turntable, a tone arm mounted for pivotal movement from a first off-record position, to a second playing position over a record on said turntable, a record changer including a cam driven by said turntable, a circuit for said motor including a switch normally spring-urged to open position, first and second levers, each said lever engaging said switch and individually pivotable from a first position permitting said switch to open, to a second position effecting closure of said switch, spring means urging said levers to second position, means fixed with said cam and responsive to movement thereof to predetermined position to periodically engage and pivot said first lever only, to move the same to first position against the urge of said spring means, and means operated by and in response to movement of said tone arm to first position, to pivot said second lever only to its said first position against the urge of said spring means.

2. In a phonograph, a turntable, a motor, driving connections between said motor and said turntable, a tone arm mounted for pivotal movement about a normally vertical axis, from a first off-record position to a second position for playing a record on said turntable, a record changer including a cam driven periodically by and from said turntable, a circuit for said motor including a snap-action switch, grst and second levers pivoted on a common axis, each said lever engaging said switch and pivotable from a first position permitting said switch to open, to a second position effecting closure thereof, spring means individually urging each said lever into second position, means operated by movement of said tone arm from its said first to its said second position, to effect pivoting of said second lever to second position under urge of said spring means, and means operated by said cam to periodically engage and pivot said first lever to its said first position against the urge of said spring means.

3. A combined manual and automatic control for a phonograph, comprising, a turntable, a motor, a driving connection between said turntable and said motor, a tone arm mounted for pivotal movement about a normally vertical axis, from a first, off-record position to a second playing position over a record on said turntable, a record changer including a member rotated periodically by and from said turntable, a circuit for said motor including a switch normally spring-urged to open position, first and second levers each engaging said switch and individually pivotable from a first position permitting said switch to open, to a second position positively closing said switch, spring means individually urging each said lever to second position, means actuated by and in response to pivoting of said tone arm from second to first positions to engage and pivot said second lever to its said first position, rotation of said member to predetermined position engaging said first lever to pivot the same to its said first position against the urge of said spring means.

4. In a motor control for a record player, a turntable, a motor connected to rotate said turntable, a tone arm pivotable from a first, off-record position to a second playing position over a record on said turntable, a record changer including a cam periodically rotated by said turntable, a control circuit for said motor and including a switch spring-urged to open position, first and second levers each individually engaging said switch and each individually pivotable from a first position permitting said switch to open, to a second position positively engaging and closing the same, first and second springs each engaging a respective one of said levers to urge the same to second position, a rod mounted for longitudinal translation radially of the axis of rotation of said cam, and including a roller engaging the periphery of said cam and an arm engageable with said second lever, a connection moving said rod to engage and pivot said second lever to its said first position, by and in response to pivoting of said tone arm to its said first position, against the urge of said second spring, and means rotatable with said cam to periodically engage and rotate said first lever to its said first position.

5. The device of claim 4, rotation of said cam to remove said last-named means from contact with said first lever, acting through said roller to translate said rod and thereby pivot said tone arm to its said first position.

References Cited by the Examiner

UNITED STATES PATENTS

| | | | |
|---|---|---|---|
| 2,684,248 | 7/54 | Jahncke | 274—10 |
| 2,707,639 | 5/55 | Vistain | 274—10 |
| 2,763,487 | 9/56 | Fortune | 274—10 |
| 2,831,693 | 4/58 | Zahner | 274—10 |
| 2,906,537 | 9/59 | Dale | 274—10 |

NORTON ANSHER, *Primary Examiner.*

JOHN P. WILDMAN, *Examiner.*